US008730680B2

(12) United States Patent
Tang

(10) Patent No.: US 8,730,680 B2
(45) Date of Patent: May 20, 2014

(54) CHIP CARD HOLDING MECHANISM AND ELECTRONIC DEVICE USING THE SAME

(75) Inventor: Zi-Ming Tang, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 202 days.

(21) Appl. No.: 13/167,991

(22) Filed: Jun. 24, 2011

(65) Prior Publication Data

US 2012/0134119 A1     May 31, 2012

(30) Foreign Application Priority Data

Nov. 30, 2010    (CN) .......................... 2010 1 0566413

(51) Int. Cl.
    *H05K 7/12*            (2006.01)

(52) U.S. Cl.
    USPC ............................ 361/737; 361/754; 439/159

(58) Field of Classification Search
    USPC .......... 361/807, 808, 679.4, 679.02, 679.031, 361/679.38, 679.43, 679.58, 679.39, 748, 361/737, 754, 798, 801; 439/258, 350, 159, 439/160, 188, 630, 152, 296, 325, 326; 455/558, 557, 550.1
See application file for complete search history.

(56) References Cited

U.S. PATENT DOCUMENTS

| | | | | |
|---|---|---|---|---|
| 6,022,228 A | * | 2/2000 | Kuo | 439/159 |
| 6,210,188 B1 | * | 4/2001 | Chang | 439/159 |
| 6,247,946 B1 | * | 6/2001 | Nakamura et al. | 439/159 |
| 6,991,480 B2 | * | 1/2006 | Katayanagi et al. | 439/159 |
| 7,066,748 B2 | * | 6/2006 | Bricaud et al. | 439/159 |
| 7,404,723 B1 | * | 7/2008 | Chen | 439/159 |
| 7,568,928 B2 | * | 8/2009 | Hou et al. | 439/188 |
| 7,766,678 B1 | * | 8/2010 | Abe | 439/159 |
| 7,811,106 B2 | * | 10/2010 | Lin et al. | 439/159 |
| 7,865,210 B2 | * | 1/2011 | Wang et al. | 455/550.1 |
| 2007/0287312 A1 | * | 12/2007 | Yu et al. | 439/160 |

FOREIGN PATENT DOCUMENTS

TW         M391199        10/2010

\* cited by examiner

*Primary Examiner* — Angel R Estrada
*Assistant Examiner* — Dimary Lopez
(74) *Attorney, Agent, or Firm* — Novak Druce Connolly Bove + Quigg LLP

(57) ABSTRACT

A chip card holding mechanism includes a support bracket defining a receiving chamber and an opening communicating with the receiving chamber; a resilient member fixed to the support bracket at an end of the support bracket opposite to the opening, and partial received in the receiving chamber; a latching assembly rotatably fixed to the support bracket and further comprising a pair of latching portions; and a tray slidably assembled to the support bracket, in which the tray comprises an accommodating space defined thereon to receive a chip card, and a pair of opposite sidewalls adjacent to the accommodating space, each sidewall defining a latching groove according to the corresponding latching portion; and the tray is received in the receiving chamber by having the latching portions of the latching assembly engaged in the latching grooves and resisting against the resilient member. An electronic device using the same is also provided.

18 Claims, 8 Drawing Sheets

CHIP CARD HOLDING MECHANISM AND ELECTRONIC DEVICE USING THE SAME

BACKGROUND

1. Technical Field

The present disclosure relates to a holding mechanism, and particularly, to a chip card holding mechanism and an electronic device using the same.

2. Description of Related Art

A multifunctional portable electronic device uses chip cards for storage and communication such as, for example, secure digital memory card (SD Card), compact flash card (CF Card) and subscriber identification module card (SIM Card).

A typical portable electronic device includes a base body and a chip card holding mechanism for fixing a chip card. The base body defines a receiving chamber to receive the chip card. As is commonly used, the chip card holding mechanism includes a cover, a shaft, a resilient clip received in the receiving chamber of the base body. The chip card is fixed in the receiving chamber and resisted by the resilient clip. The cover rotatably connects with the base body via the shaft. The chip card is attached to the base body and resists the cover and the resilient clip. When the chip card is to be released from the chip card holding mechanism, one needs to push it so it can rotate the holding mechanism. However, the chip card holding mechanism may not unlock if the pressure of the push is not strong enough to rotate the holding mechanism, yet, too much pressure on the cover may cause the holding mechanism to be damaged.

Therefore, there is room for improvement in the art.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the buffer mechanism. Moreover, in the drawings like reference numerals designate corresponding parts throughout the several views. Wherever possible, the same reference numerals are used throughout the drawings to refer to the same or like elements of an embodiment.

DETAILED DESCRIPTION

Figure 1:
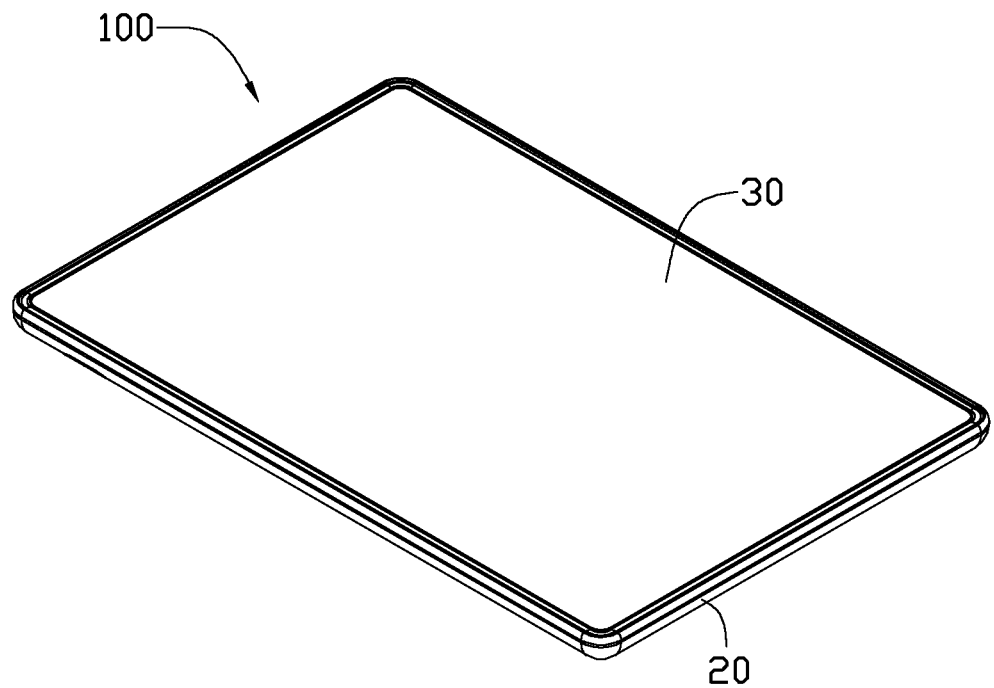
FIG. 1 is an isometric view of an embodiment of an electronic device having a chip card holding mechanism.
Figure 2:
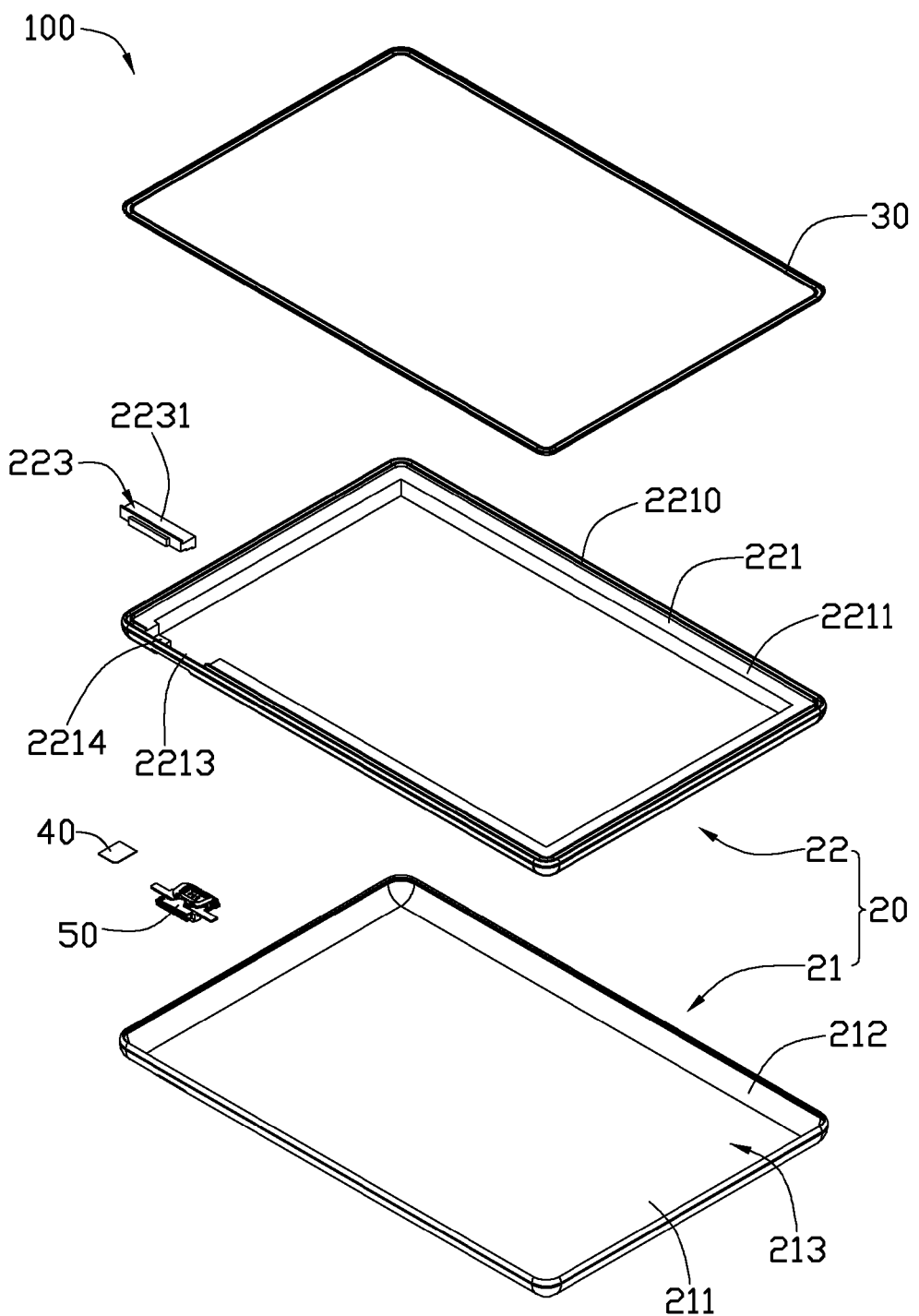
FIG. 2 is an exploded, isometric view of the electronic device of FIG. 1.
Figure 3:
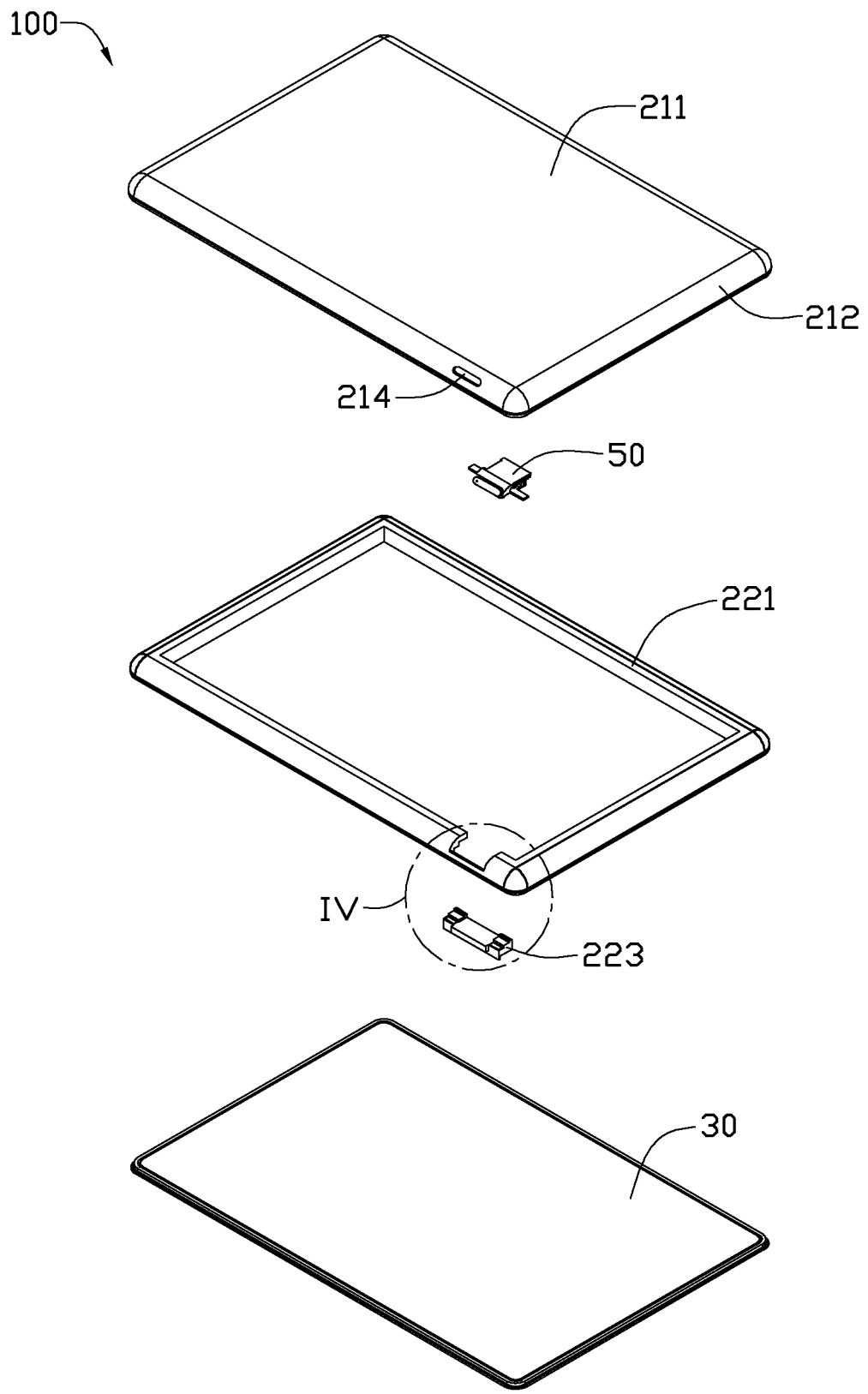
FIG. 3 is similar to FIG. 2, but viewed from another aspect.

Referring to FIGS. 1 through 3, an electronic device 100 includes a housing 20, a display panel 30, a chip card 40, and a chip card holding mechanism 50. The display panel 30 is fixed on the housing 20. The chip card holding mechanism 50 is received in the housing 20. The components having other functions such as electronic panel, backlight module and so on are hereby omitted. The chip card may be various types of cards such as a SD Card, multimedia card (MMC Card) or SIM Card. In the embodiment, the chip card is a SIM Card. The electronic device 100 may be a tablet personal computer, a mobile phone or a digital cameral. In the embodiment, the electronic device 100 is a tablet personal computer.

Figure 4:
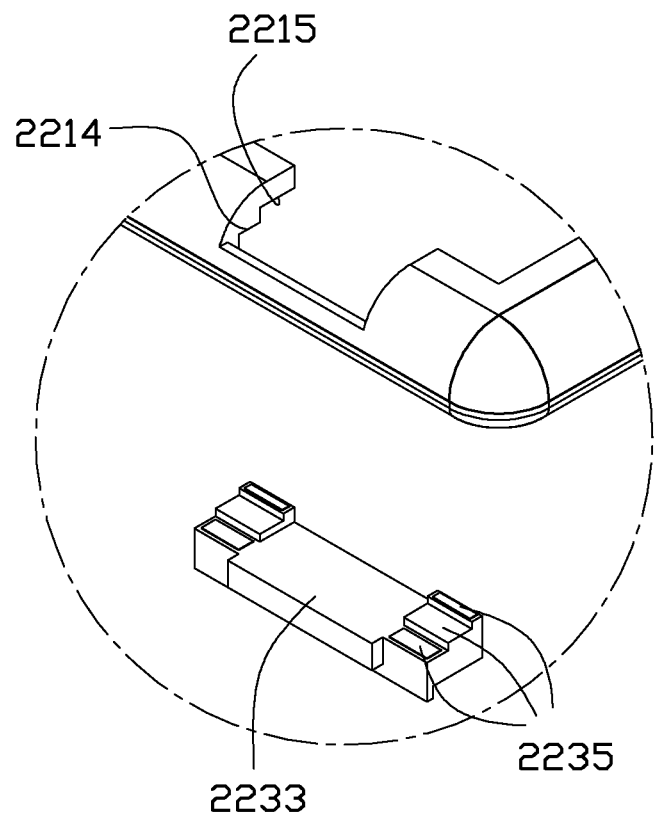
FIG. 4 is an enlarged view of a circled portion IV of FIG. 3.
Figure 5:
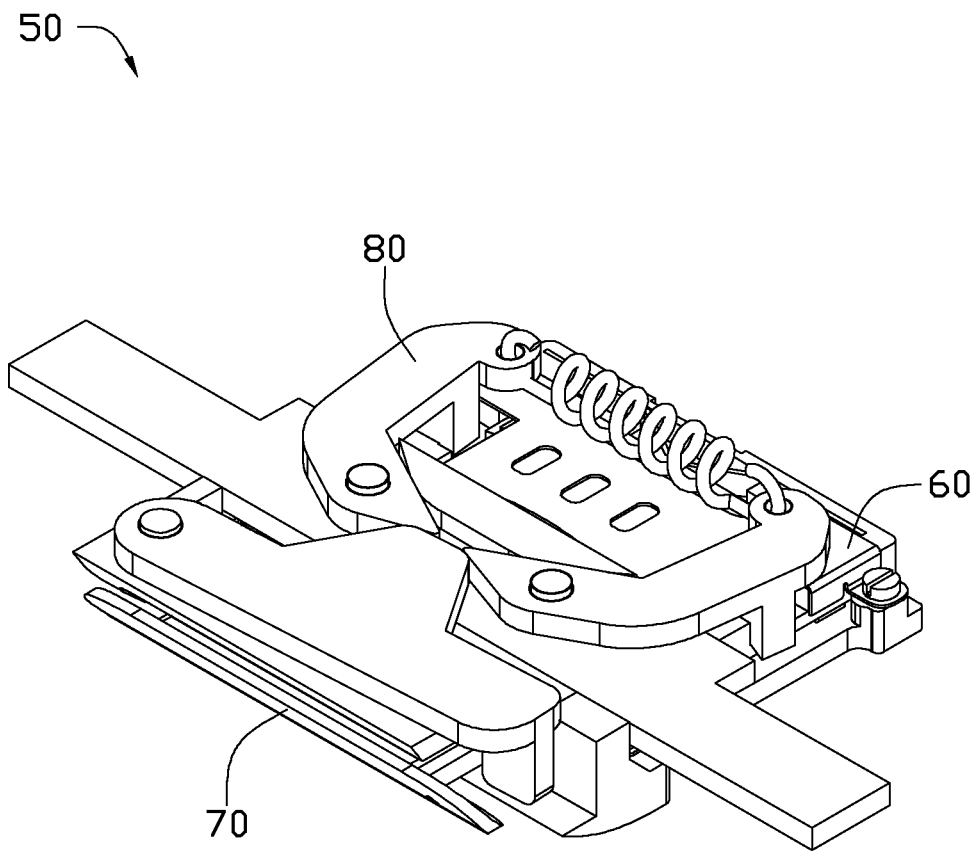
FIG. 5 is an assembled, isometric view of the embodiment of the chip card holding mechanism in FIG. 1.
Figure 6:
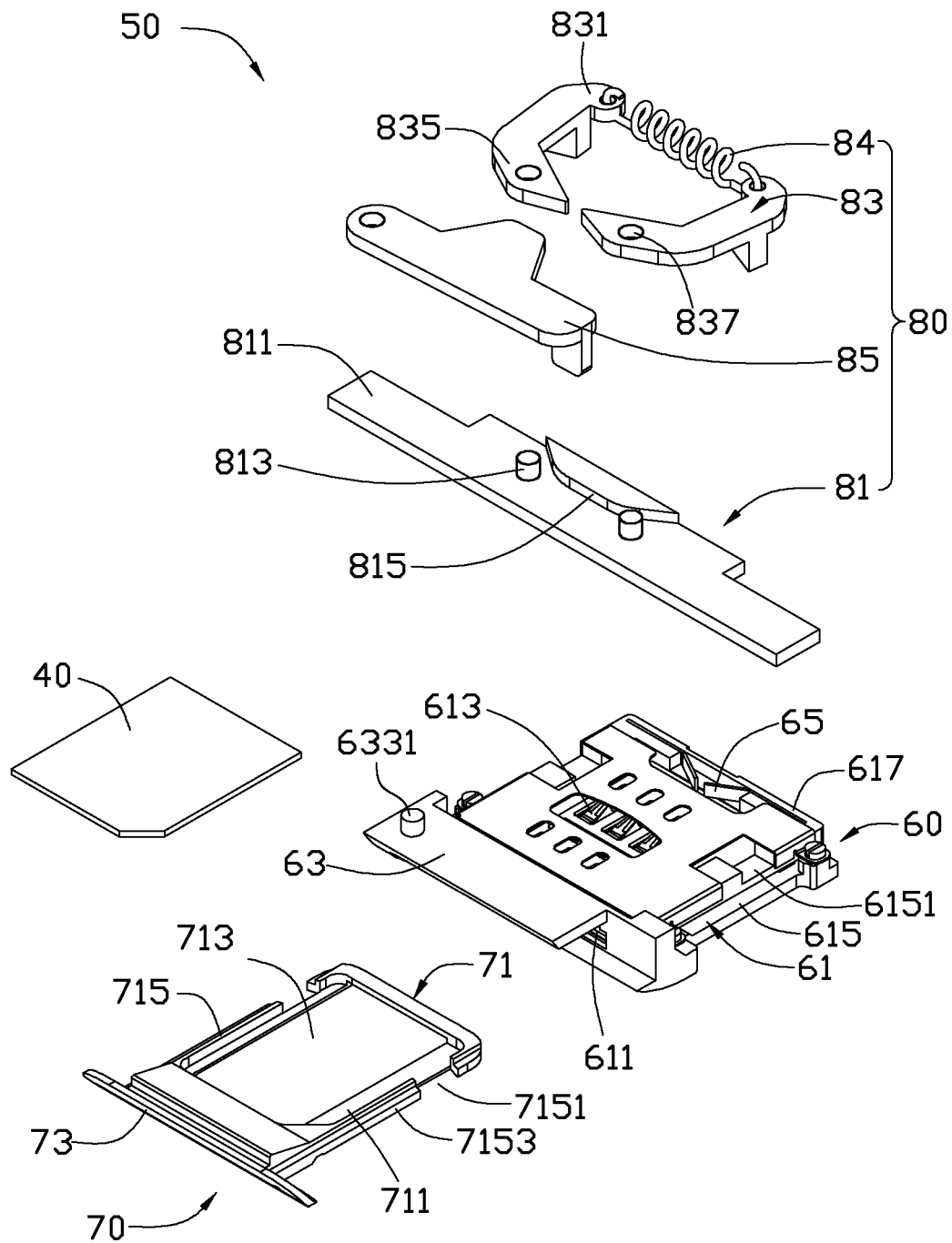
FIG. 6 is an exploded, isometric view of the chip card holding mechanism of FIG. 5.
Figure 7:
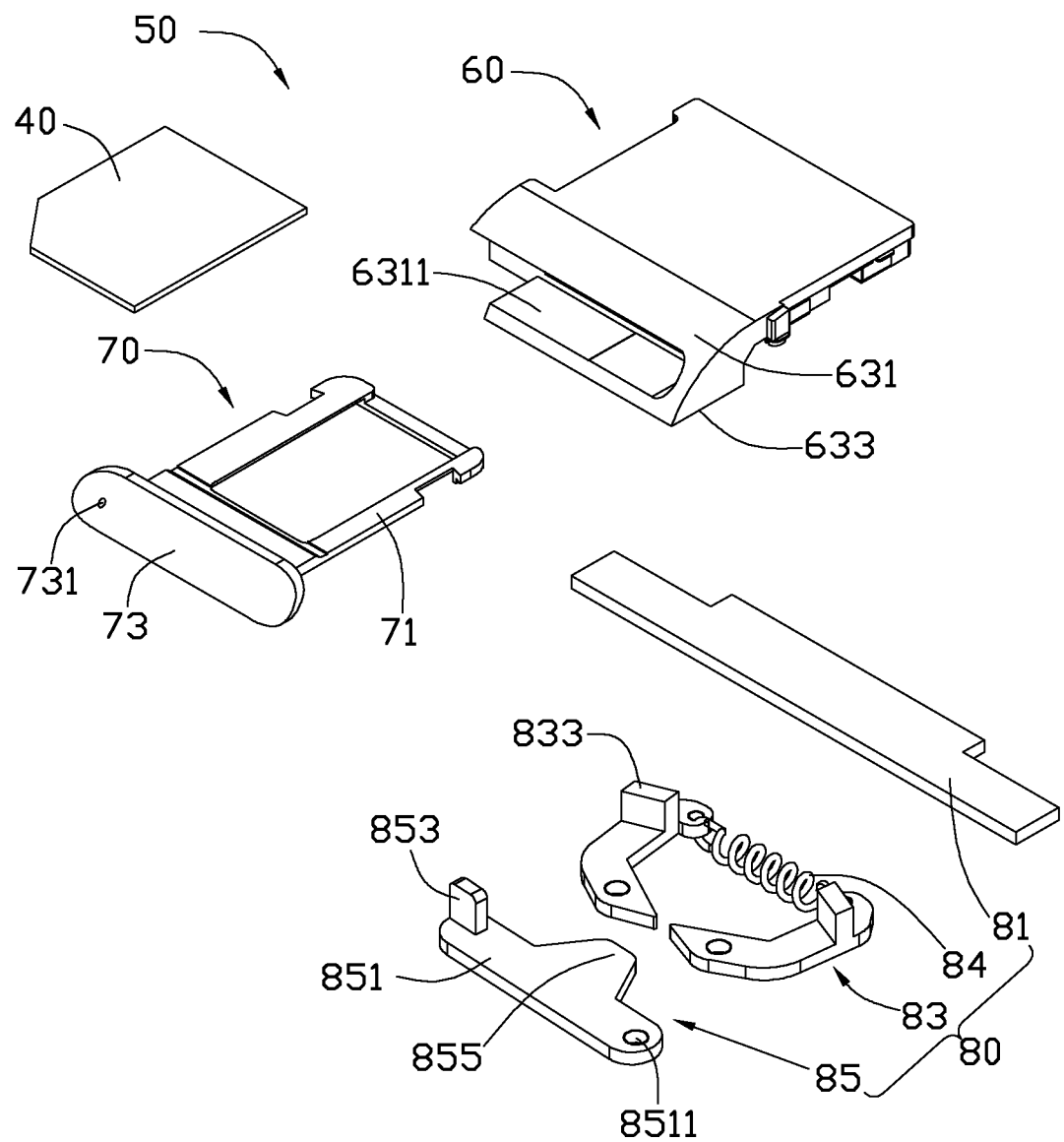
FIG. 7 is similar to FIG. 6, but viewed from another aspect.
Figure 8:
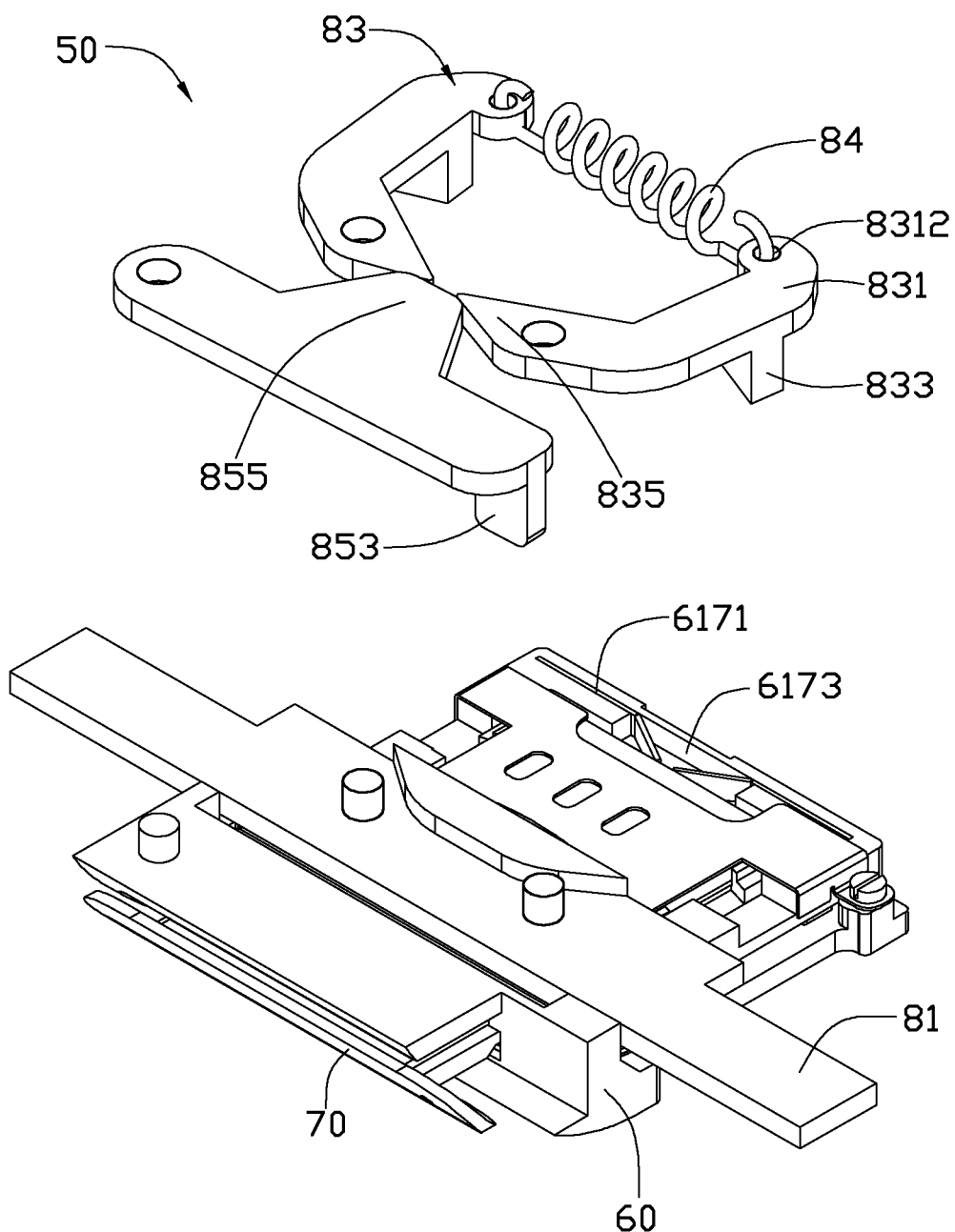
FIG. 8 is an exploded, isometric view of a part of the electronic device of FIG. 5.

Referring to FIGS. 2 through 4, the housing 20 includes a bottom housing 21 and a support frame 22 fixed on the bottom housing 21. The bottom housing 21 includes a bottom plate 211 and a plurality of sidewalls 212. The sidewalls 212 extend from the edges of the bottom plate 211 along a predetermined direction. The bottom plate 211 smoothly connects with the sidewalls 212, and has a plurality of arc-shaped corners. The bottom plate 211 and the sidewalls 212 cooperatively define a chamber 213. One of the sidewalls 212 defines a through hole 214 adjacent to an end (see FIG. 3) in a strip shape to allow the chip card 40 to pass through.

The support frame 22 includes a supporting base 221 and a fixing portion 223. The supporting base 221 is substantially rectangular, and includes four reinforcement sidewalls 2210 connecting in order. The supporting base 221 further includes a continuous first stepped surface 2211 defined at a top of the four reinforcement sidewalls 2210 away from the bottom plate 211 of the bottom housing 21. The first stepped surface 2211 defines a stepped hole 2213 corresponding to the through hole 214. The stepped hole 2213 is substantially square. The supporting base 221 further includes a second stepped surface 2214 and a third stepped surface 2215 (see FIG. 4) adjacent to the stepped hole 2213. The second stepped surface 2214 is disposed between the first stepped surface 2211 and the third stepped surface 2215. The fixing portion 223 is fixed to the supporting base 221 adjacent to the stepped hole 2213. The fixing portion 223 includes an upper surface 2231 and a bottom surface 2233. The upper surface 2231 is coplanar with the first stepped surface 2211. The bottom surface 2233 includes three stepped matching surfaces 2235 corresponding to the first, second, third stepped surfaces 2211, 2214, 2215, respectively.

The display panel 30 is fixed on the first stepped surface 2211 of the support frame 22. In the embodiment, the display panel 30 is firmly adhered on the first stepped surface 2211.

Referring to FIGS. 2, and 5 through 8, the chip card holding mechanism 50 is fixed in the chamber 213 of the housing 20 to hold the chip card 40. The chip card holding mechanism 50 includes a support bracket 60, a tray 70 and a latching assembly 80. The support bracket 60 is fixed to the bottom plate 211 adjacent to the through hole 214. In the embodiment, the support bracket 60 is adhered to the bottom plate 211. The support bracket 60 includes a receptacle 61, an end portion 63 adjacent to the receptacle 61 and a pair of resilient members 65. The receptacle 61 connects with the end portion 63. The peripheral of the receptacle 61 and the end portion 63 facing the though hole 214 matches with the inner surface of the bottom housing 21 correspondingly. The receptacle 61 is a hollowed cuboid and defines a receiving chamber 613 and an opening 611 facing the through hole 214, the opening 611 communicates with the receiving chamber 613. The tray 70 is received in the receiving chamber 613 via the opening 611. The receptacle 61 includes two sidewalls 615 opposite to each other and a resisting wall 617 connecting with the two sidewalls 615 of the receptacle 60 at two ends. Each sidewall 615 defines a guiding groove (not shown) along a lengthwise direction and a first latching groove 6151 at a distal end from the opening 611. The resisting wall 617 is disposed at the side of the receiving chamber 613 opposite to the opening 611. The resisting wall 617 defines a pair of second latching grooves 6171 (see FIG. 8) and a receiving groove 6173 located between the two second latching grooves 6171. The receiving groove 6173 communicates with the two second latching grooves 6171. The end portion 63 includes an arcuate side surface 631 and an upper surface 633 connecting with the side surface 631. The side surface 631 defines an opening 6311 corresponding to the opening 611 of the receptacle 61 and the through hole 214 of the bottom housing 21. The end portion 63 further includes a post 6331 located at the supper surface 633 adjacent to one of the sidewalls 615. Each resilient member 65 is a bent resilient clip and detachably fixed in the resisting wall 617. One end of the resilient members 65 is fixed in the second latching groove 6171, and the other end of the resilient member 65 is bent towards the receiving chamber 613 and received in the receiving groove 6173.

The tray 70 is slidably assembled to the support bracket 60, and is capable of being received in the receiving chamber 613 via the latching assembly 80. The tray 70 includes a supporting portion 71 and a shielding portion 73. In the embodiment, the supporting portion 71 is a substantially rectangular plate. The supporting portion 71 defines an accommodating space 711 thereon in rectangular shape to receive the chip card 40. The supporting portion 71 further defines an opening 713 in a bottom surface of the supporting portion 71 and communicating with the accommodating space 711. The chip card 40 is received in the accommodating space 711 and can be electrically connected to a plurality of electronic connectors located in the support bracket 60 via the opening 713. The supporting portion 71 includes a pair of opposite sidewalls 715 adjacent to the accommodating space 711. Each sidewall 715 defines a third latching groove 7151 corresponding to one first latching groove 6151. Each side wall 715 includes a rib 7153 extending outwardly corresponding to the guiding grooves of the support bracket 60. The tray 70 is capable of sliding along the guiding grooves and received in the receiving chamber 613. The shielding portion 73 has a shape corresponding to the through hole 214. When the supporting portion 71 received in the receiving chamber 613 completely, the shielding portion 73 is received in the through hole 214 correspondingly. The shielding portion 73 further defines an unlocking hole 731 (see FIG. 7) at one end.

The latching assembly 80 is assembled to the support bracket 60 to latch or release the tray 70. The latching assembly 80 includes a fixing member 81, a pair of hooking members 83, an elastic member 84 and a resisting member 85. The fixing member 81 is a substantial rectangular plate, and includes a base body 811 in strip shape, a pair of rotation posts 813 and a restricting protrusion 815. The restricting protrusion 815 is a substantial trapezium plate and fixed at an edge of the base body 811. The restricting protrusion 815 is also located at a middle position of the base body 811 lengthwise, and tapered toward the opposite edges of the base body 811. The rotation posts 813 are fixed on a middle portion of the base body 811 symmetrically relative to a center of the base body 811. The hooking members 83 are opposite to each other. Each hooking member 83 includes a connecting portion 831 at a first end, a latching portion 833, and a hinging portion 835 at a second end thereof opposite to the first end. The connecting portion 831 defines a connecting hole 8312 rotatably connecting with one end of the elastic member 84. The latching portion 833 extends from each hooking member 83 towards the tray 70 corresponding to the third latching groove 7151. In the illustrated embodiment, the latching portion 833 is a substantially square block adjacent to the first end of the hooking member 83. The hinging portion 835 is bent and extends away from the connecting portion 831. The hinging portion 835 forms a shape on an inner side surface corresponding to that of the restricting protrusion 815 of the fixing member 81, and a shape on an outer side surface corresponding to the resisting member 85. The hinging portion 835 defines a connecting hole 837 corresponding to one rotation post 813. Each rotation post 813 engages in the corresponding connecting hole 837 to enable the hooking member 83 to rotate about the rotation post 813. The elastic member 84 and the two hooking members 83 cooperatively form a substantially square shape. The resisting member 85 includes a base body 851, a releasing block 853 and a resisting portion 855. The base body 851 is substantially a rectangular plate and defines a connecting hole 8511 at an end corresponding to the post 6331. The resisting portion 855 is a stepped block extending from a middle portion of a side surface of the base body 851 towards the two hooking members 83. The resisting portion 855 is tapered toward the hooking members 83. The resisting member 85 is capable of rotating the hooking members 83 via having the resisting portion 855 resisting the hinging portions 835.

When assembling the electronic device 100, the support bracket 60 is fixed on the housing 20, the opening 611 of the support bracket 60 is communicated with the through hole 214. The supporting base 221 is fixed on the housing 20 with the stepped hole 2213 communicating with the through hole 214. The fixing member 81 is fixed on the third stepped surface 2215 via two opposite ends thereof, and then the fixing member 81 is located upon the receptacle 61 adjacent to the end portion 63. The elastic member 84 is connected to the hooking members 83 by two ends thereof, respectively. The hooking members 83 are then placed upon the receptacle 61. The rotation posts 813 engage in the connecting holes 837 of the hooking members 83 respectively. The latching portions 833 engage in the first latching grooves 6151 respectively. Then, the fixing portion 223 of the support frame 22 is fixed on the supporting base 221 with the three stepped matching surfaces 2235 matching with the second stepped surface 2214, the third stepped surface 2215 and the two end surfaces of the fixing member 81 respectively. The supporting portion 71 of the tray 70 is moved toward the receiving chamber 613. The sidewalls 715 resist against the latching portions 833 of the hooking members 83 respectively to stretch the elastic member 84. And then, the latching portions 833 slide out of the first latching grooves 6151 of the receptacle 61. The tray 70 is moved toward the receptacle 61, and the latching portions 833 engage in the first latching grooves 6151, respectively, thus the tray 70 is received in the receiving chamber 613.

When replacing the chip card 40, a rod (not shown) is extended through the unlocking hole 731 and pushes the releasing block 853, then the resisting portion 855 resists against the hinging portions 835. The hooking members 83 rotate about the rotation posts 813, respectively, to enable the connecting portions 831 to stretch the elastic member 84 transversally. In addition, the latching portions 833 is moved outwardly along the third latching groove 7151. Finally, the tray 70 is ejected out of the support bracket 60 at the resistance of the resilient members 65.

In the embodiment, The latching mechanism 80 is capable of engaging or disengaging with the tray 70 to enable the tray 70 to be received into or ejected out of the receiving chamber 613, so that the chip card 40 may be replaced easily. The connecting reliability between the chip card 40 and the electronic connectors is improved because of the latching action of the latching mechanism 80 and the resistance of the resilient members 65, thus a better connection between the chip card 40 and the electronic connectors is thereby achieved.

It is to be understood that the present disclosure is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A chip card holding mechanism, comprising:
   a support bracket defining a receiving chamber and an opening communicating with the receiving chamber;
   a resilient member fixed to the support bracket at an end of the support bracket opposite to the opening, and partial received in the receiving chamber;
   a latching assembly rotatably fixed to the support bracket and further comprising an elastic member and a pair of hooking members, each hooking member comprising a connecting portion at a first end thereof and a latching portion adjacent to the first end, the two connecting portions of the two hooking members being connected together by the elastic member; and
   a tray slidably assembled to the support bracket and capable of being received into or ejected out of the receiving chamber via the latching assembly, wherein the tray comprises an accommodating space defined thereon to receive a chip card, and comprises a pair of opposite sidewalls integrally adjacent to the accommodating space, each sidewall defining a latching groove according to the corresponding latching portion; and the tray is received in the receiving chamber by having the latching portions of the latching assembly engaging in the latching grooves and resisting the resilient member.

2. The chip card holding mechanism of claim 1, wherein the latching assembly further comprises a fixing member fittingly fixed to the support bracket and a resisting member rotatably assembled to the support bracket, the hooking member further comprises a hinging portion at a second end thereof opposite to the first end, each hooking member rotatably contacting with the fixing member via the hinging portion, and the resisting member is capable of resisting the hinging portions to rotate the hooking members.

3. The chip card holding mechanism of claim 2, wherein the support bracket further comprises a post, the resisting member comprises a resisting portion and a releasing block at an end, the resisting member defines a connecting hole at the other end, a rotation post of the fixing member engages in the connecting hole to enable the resisting member rotatably connect with the support bracket, the resisting portion resists the hooking members when the releasing block is pushed.

4. The chip card holding mechanism of claim 1, wherein the support bracket comprises two sidewalls defining a pair of guiding grooves respectively, the tray comprises a plurality of ribs corresponding to the guiding grooves, and the ribs are engaged in the guiding grooves respectively to enable the tray slide along the guiding grooves and be received in the receiving chamber.

5. The chip card holding mechanism of claim 4, wherein the support bracket further comprises a resisting wall connecting with the two sidewalls of the support bracket at two ends, the resilient member is fixed in the resisting wall with an end, and the other end of the resilient member is bent toward the receiving chamber and resists the tray.

6. A chip card holding mechanism, comprising:
   a support bracket defining a receiving chamber and an opening communicating with the receiving chamber;
   a resilient member fixed to the support bracket at an end of the support bracket opposite to the opening, and partial received in the receiving chamber;
   a tray slidably assembled to the support bracket and capable of being received into or ejected out of the receiving chamber via the latching assembly, wherein the tray comprises an accommodating space defined thereon to receive a chip card, and a pair of opposite sidewalls adjacent to the accommodating space, each sidewall defining a latching groove;
   a latching assembly comprising a pair of hooking members and a resisting member, each hooking member comprising a latching portion corresponding to the latching groove, the resisting member comprising a resisting portion and a releasing block at an end, the resisting member rotatably connecting with the support bracket at the other end, the resisting portion resisting the hooking members to rotate the hooking members when the releasing block is pushed, thus the latching portions of the hooking members being capable of engaging or disengaging with the latching grooves to enable the tray to be received into or ejected out of the receiving chamber.

7. The chip card holding mechanism of claim 6, wherein the latching assembly further comprises an elastic member, each hooking member comprises a connecting portion at a first end thereof, and the two connecting portions of the two hooking members are connected together by the elastic member.

8. The chip card holding mechanism of claim 7, wherein the latching assembly further comprises a fixing member fittingly fixed to the support bracket, each hooking member further comprises a hinging portion at a second end thereof opposite to the first end and each hooking member rotatably contacting with the fixing member via the hinging portion, and the resisting portion of the resisting member is capable of resisting the hinging portions.

9. The chip card holding mechanism of claim 8, wherein the support bracket further comprises a post, the resisting member comprises a base body, the base body defines a connecting hole at an end opposite to the releasing block, a rotation post of the fixing member engages in the connecting hole to enable the resisting member rotatably connect with the support bracket.

10. The chip card holding mechanism of claim 6, wherein the support bracket comprises two sidewalls defining a pair of guiding grooves, the tray comprises a plurality of ribs corresponding to the guiding grooves, and the ribs are engaged in the guiding grooves to enable the tray slide along the guiding grooves and be received in the receiving chamber.

11. The chip card holding mechanism of claim 10, wherein the support bracket further comprises a resisting wall connecting with the two sidewalls of the support bracket at two ends, the resilient member is fixed in the resisting wall with an end, and the other end of the resilient member is bent toward the receiving chamber and resists the tray.

12. An electronic device comprising:
   a housing comprising a bottom housing and a support frame fixed on the bottom housing, the bottom housing defining a through hole, the support frame defining a stepped surface and stepped hole on the stepped surface, the stepped hole corresponding to the through hole;
   a chip card holding mechanism, comprising:
   a support bracket assembled in the housing defining a receiving chamber and an opening corresponding to the through hole, the opening communicating with the receiving chamber;
   a resilient member fixed to the support bracket at an end of the support bracket opposite to the opening, and partial received in the receiving chamber;

a latching assembly rotatably fixed to the stepped surface of the support frame adjacent to the stepped hole and the latching assembly further comprising a pair of latching portions;

a tray slidably assembled to the support bracket and capable of being received in or ejected out of the receiving chamber via the latching assembly, wherein the tray comprises an accommodating space defined thereon, and comprises a pair of opposite sidewalls integrally adjacent to the accommodating space, each sidewall defining a latching groove according to the corresponding latching portion; and the tray is received in the receiving chamber by having the latching portions of the latching assembly engaged in the latching grooves and resisting the resilient member; and a chip card received in the accommodating space.

13. The electronic device of claim 12, wherein the latching assembly further comprises an elastic member and a pair of hooking members, and the pair of the latching portions extends from each hooking member towards the tray corresponding to the latching groove and is adjacent to the first end of the hooking member, and the two connecting portions are connected together via the elastic member.

14. The electronic device of claim 13, wherein the latching assembly further comprises a fixing member fittingly fixed to the support bracket and a resisting member rotatably assembled to the support bracket, the hooking member further comprises a hinging portion at a second end thereof opposite to the first end, each hooking member rototatably connects with the fixing member via the hinging portion, and the resisting member is capable of resisting the hinging portions.

15. The electronic device of claim 14, wherein the support bracket further comprises a post, the resisting member comprises a resisting portion and a releasing block at an end, the resisting member defines a connecting hole at the other end, a rotation post of the fixing member engages in the connecting hole to enable the resisting member rotatably connect with the support bracket, the resisting portion resists the hooking members when the releasing block is pushed.

16. The electronic device of claim 15, wherein the tray comprises a shielding portion having a shape corresponding to the through hole at a distal end away from the resilient members, the shielding portion defines an unlocking hole corresponding to the releasing block of the resisting member.

17. The electronic device of claim 12, wherein the support bracket comprises two sidewalls defining a pair of guiding grooves, the tray comprises a plurality of ribs corresponding to the guiding grooves, and the ribs engage with the guiding grooves to enable the tray to slide along the guiding grooves and be received in the receiving chamber.

18. The electronic device of claim 17, wherein the support bracket further comprises a resisting wall connecting with the two sidewalls of the support bracket by two ends, the resilient member is fixed on the resisting wall with an end, and the other end of the resilient member is bent toward the receiving chamber and resists the tray.

* * * * *